United States Patent [19]

Connelly

[11] 4,004,832
[45] Jan. 25, 1977

[54] THREAD FORM FOR PIPE JOINTS

[75] Inventor: Eugene B. Connelly, Churchill Borough, Pa.

[73] Assignee: United States Steel Corporation, Pittsburgh, Pa.

[22] Filed: Sept. 19, 1975

[21] Appl. No.: 614,801

[52] U.S. Cl. .............................. 285/333; 285/417
[51] Int. Cl.² ..................................... F16L 15/00
[58] Field of Search .......... 285/333, 334, 390, 355, 285/417; 85/46

[56] References Cited

UNITED STATES PATENTS

| | | | |
|---|---|---|---|
| 2,051,499 | 8/1936 | Siegle | 285/333 |
| 2,094,491 | 9/1937 | Janata | 285/333 |
| 2,909,380 | 10/1959 | Hoye et al. | 285/333 |
| 3,258,284 | 6/1966 | Phipps | 285/390 X |

Primary Examiner—Thomas F. Callaghan
Attorney, Agent, or Firm—John F. Carney

[57] ABSTRACT

The tensile and compressive strength characteristics of pipe joints, particularly those adapted for use in oil well casings, are improved by a novel thread configuration on the mating pipe and coupling members. The threads are symmetrical, round threads having relatively large radius crests and roots. They include flank portions between the respective crests and roots disposed on angles not greater than angles of repose of the joint materials.

Pipe joints employing the described thread configuration are easier to fabricate and are capable of more rapid make-up while the danger of cross-threading and jamming is minimized.

4 Claims, 2 Drawing Figures

THREAD FORM FOR PIPE JOINTS

BACKGROUND OF THE INVENTION

The present invention relates to a tapered thread configuration particularly adapted for use in the pipe joints of oil well casing or the like.

In the drilling of oil wells large diameter pipe is lowered into the ground as drilling progresses to restrain the surrounding earth from entering the hole and to prevent the well products from escaping into the surrounding strata. Relatively short lengths of these pipe are joined together by threaded couplings to create the long casing "string" needed to ultimately reach the bottom of the well. Since these "strings" of casing can be as much as five miles in length it is obvious that the threads, in addition to providing a fluid tight joint, must be exceptionally strong in order to support the weight of such a great length of casing. Not only must the threads be strong in tension in order to suspend the string from above but they must also be capable of withstanding a compressive loading of substantially equal force, as occurs when the leading end of the casing encounters an obstruction in the hole through which the casing must be caused to break through. At these times the weight of the string may be dropped against the obstruction to effect a breakthrough, thus loading the threads in compression.

In practice additional pipe lengths are added to the casing string by rigidly restraining the uppermost pipe immediately below the coupling assembled at its upper end; thereafter; lowering the pipe to be added into the coupling and rotating it to make up the threads. Since each pipe length may weigh up to 2 tons, lowering the heavy, unwieldy pipe into the coupling often results in the threads crossing or jamming rather than mating. This, of course, requires that the members be freed and another attempt be made to mate them. In addition to adding to the cost of the operation, the danger to the surrounding area from well "blow out" is increased since "blow out" protection devices cannot be applied to the apparatus until the casing is completely in place.

It has been proposed to employ a thread with rounded crests and roots and an intermediate flank in large diameter pipe and coupling members in order to increase the tensile strength properties of the joint. Such a thread form is described in U.S. Pat. No. 2,909,380, issued Oct. 20, 1959 to E. C. Haye, et al. This proposed thread form cannot, however, perform adequately in applications such as those contemplated for use of the present invention where a coupling that is also strong in compression is required. Also, due to the asymmetrical nature of the thread form, members incorporating the same will be more difficult to fabricate than those incorporating a thread form as described herein.

It is to an improved form of threaded joint connections particularly for apparatus of the above type, therefore, that the present invention is directed.

SUMMARY OF THE INVENTION

According to the present invention there is provided, particularly for use with large diameter pipe sections, such as, for example, oil well casing, or the like, a threaded joint including mating male and female members having substantially complimentary cooperating tapered threaded surfaces. The threads have crests and roots which, in profile, are arcs of circles and an intermediate flank portion connecting the crests and roots. Each flank portion is arranged to be tangent along opposite sides to the adjacent crests and roots and is inclined with respect to perpendiculars to the joint axis by an amount less than the angle of repose of the joint materials.

It is, therefore, a principle object of the invention to provide an improved thread form for use in pipe joints particularly adapted for oil well casing applications that are stronger under both tension and compression loadings than casing threads of the prior art.

It is another object of the invention to provide an improved thread form of the described type with which the member of the pipe joint can be connected with reduced danger of cross threading or jamming as compared with prior art devices.

Still another object of the invention is to provide a pipe joint of the described type that is capable of being connected more rapidly than those of the prior art.

Yet another object of the invention is to provide a pipe joint of the described type that is imparted with greater leak resistance as compared with pipe joints of similar type heretofore known in the art.

And another object of the invention is to provide an improved thread form for use in pipe joints that is easier and less costly to fabricate using conventional thread chasing equipment.

These and other objects and advantages of the present invention will become more apparent when the following description is read in conjunction with the attached drawings.

DESCRIPTION OF A PREFERRED EMBODIMENT OF THE INVENTION

Figure 1:
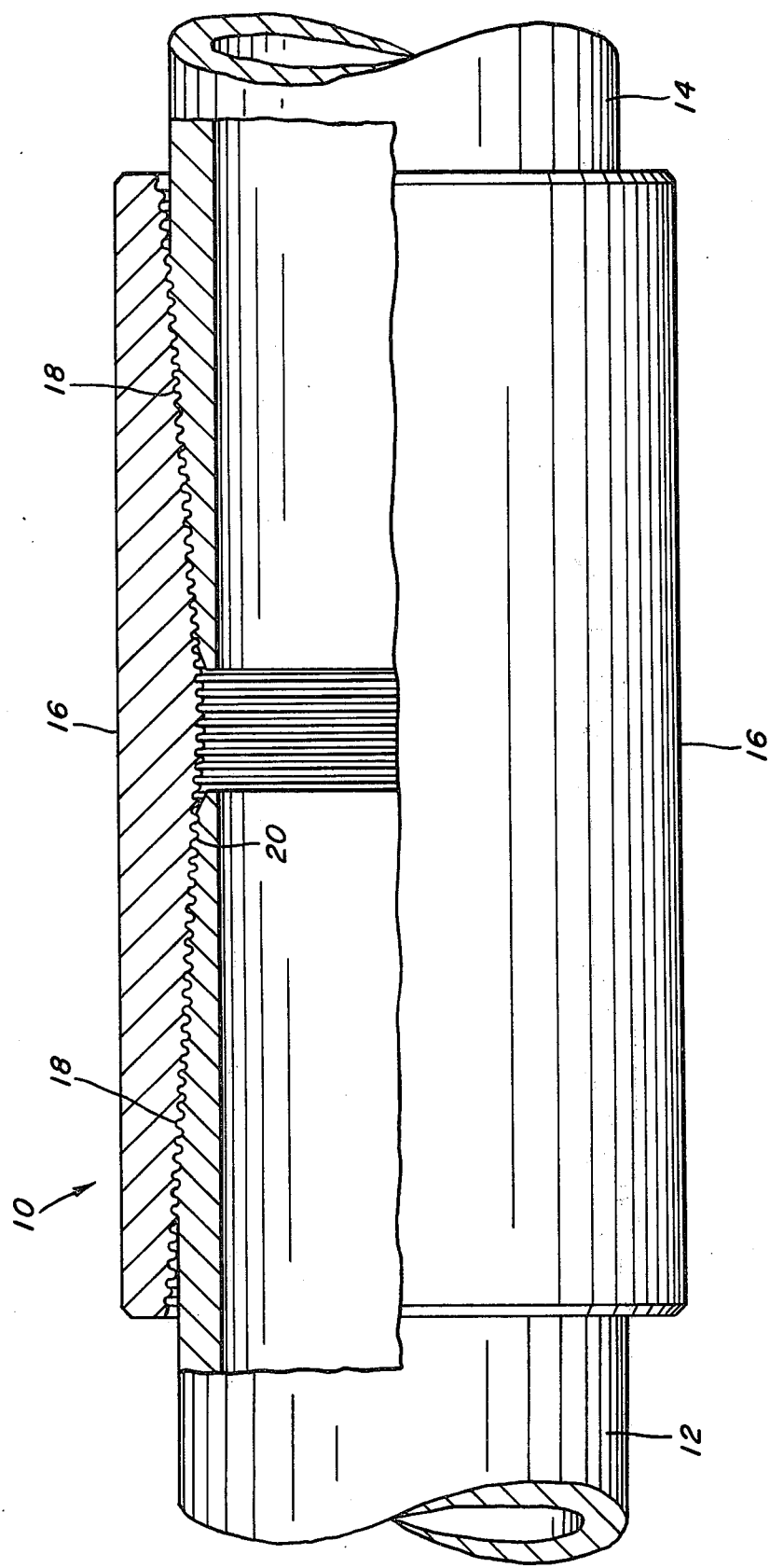
FIG. 1 is a view, partly in section, of a pipe joint particularly adapted for use in an oil well casing application and constructed according to the present invention.
Figure 2:
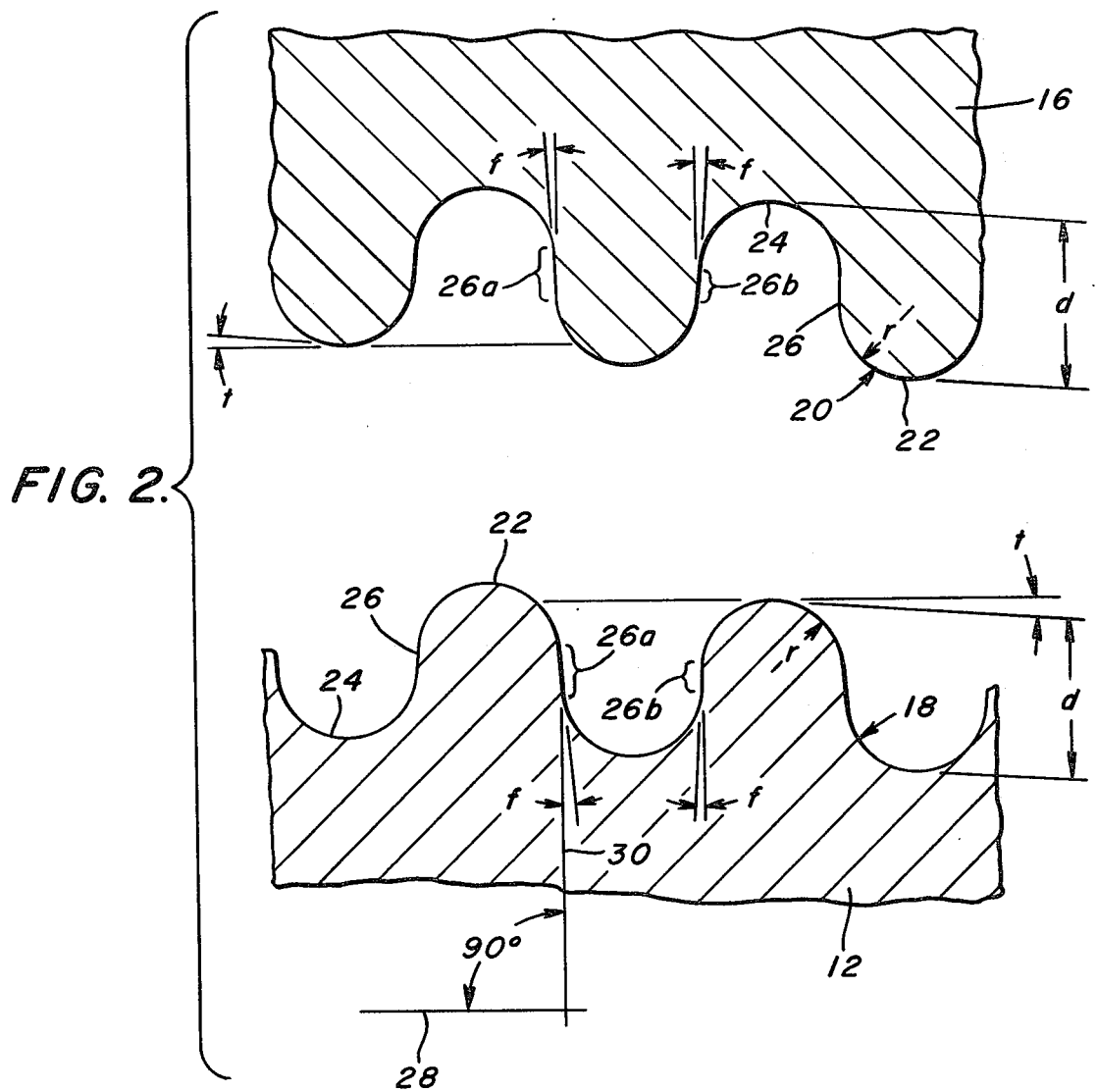
FIG. 2 is an exploded partial view of the members of the pipe joint shown in FIG. 1 illustrating an enlarged profile of the mating threads.

The pipe joint 10 shown in FIG. 1 of the drawing includes two hollow cylindrical pipe sections 12 and 14 particularly adapted for use as oil well casing structure. In practice a plurality of sections 12 and 14 are threadedly interconnected by a plurality of couplings 16 to form a casing string that may extend several miles in length. The mating threads 18 and 20 provided on the exterior of the pipe sections 12 and 14 and on the interior of the coupling 16 respectively are of a tapered, helical thread form according to the present invention. As shown best in FIG. 2 the threads 18 and 20 are each symmetrically formed with crests 22 and roots 24 composed of circular arcs. The arcs forming the crest 22 and adjacent roots 24 of each thread 18 or 20 have a flank 26 interposed therebetween with the surface of the flank being tangentially disposed with respect to the adjacent crest and root-forming arcs.

It will be appreciated that, due to the imposition of the flanks 26 between adjacent crests 22 and roots 24 the arcs forming the same will be slightly less than semi-circular. The arcs are preferably formed of a radius $r$, that is as large as practicable, i.e. as large as possible without eliminating the presence of the flanks 26, nor creating a thread depth, $d$, that is so great as to unduly weaken the pipe wall or concomitantly to create the need to increase its thickness. By forming the crests 22 of the maximum possible radius $r$ the threads are better able to absorb impact forces of a magnitude imposed by a heavy pipe section 12 or 14 being "stabbed" into a waiting coupling 16 during the assembly of the casing string. The reinforcement of the thread structure effected by the large crest and root radius also enables the use of a thread taper significantly greater than that employed on oil well casing joints heretofore known in the art. Thus, the taper, indicated as $t$ in FIG. 2, may be as great as 1½ inch on diameter per foot of thread length as compared with thread tapers of ¾ inch on diameter per foot of of thread length which is most commonly employed on pipe threads for these applications. This increase in thread taper enables the mating members to be made up in a reduced number of turns thereby permitting the joint to be fully connected more rapidly.

According to the invention, the flanks 26 interposed between the respective crests 22 and roots 24 are angularly disposed with respect to perpendiculars to the longitudinal axis 28 of the pipe joint. Such pependiculars are indicated by the lines 30 in FIG. 2. By preference, the angles $f$ at which the flanks 26 are inclined to the perpendiculars 30 are equal for reasons hereinafter explained. Due to the taper $t$ the length of the flanks 26 on the respective sides of the threads, indicated as 26a and 26b, will be unequal in length. In all cases, however, the flank angles $f$ must be less than the angle of repose of the materials employed to fabricate the joint members taking into consideration the surface condition of the threads formed in the respective metal pipe sections and coupling as well as the lubricant that may be employed in the joint connection. As long as the flank angles $f$ are not greater than the angle of repose no amount of tension or compression loadings applied to the joints 10 will create resultant radial forces sufficient to overcome the friction forces generated between the flanks 26 of the mating threads. Because the radial forces cannot overcome these friction forces, there can be no tendency for the threads to disengage since the ends of the pipe sections 12 and 14 will not constrict radially inwardly nor will the coupling 16 expand outwardly to effect such disengagement. It has been determined that, for pipe joints 10 particularly adapted for use in oil well casing structure in which the threads 18 and 20 are cut in pipe sections 12 and 14 and couplings 16 formed of medium carbon steel and employing A.P.I. Modified Thread Compound (A.P.I. Bulletin 5C2) as a lubricant, the flank angle $f$ must not exceed 10°.

It is contemplated, although not absolutely necessary for the invention, to make the threads symmetrical with all flank angles $f$ being equal. By forming the threads with equal flank angles, fabrication thereof is facilitated since the thread chasing tool employed to form the threads is subjected to balanced forces in cutting the threads such that the only force required to be imparted to the tool is that necessary to produce the thread lead. A further advantage derived from forming the flank angles $f$ equal on both thread surfaces is that the pipe joint will be rendered equally strong under both tension and compression loadings.

It will be appreciated that by forming the crests 22 and complimentary roots 24 with a radius as large as practicable, i.e. one that does not eliminate the flank 26 nor create a thread depth that may unduly weaken the pipe wall, the so-created threads are capable of withstanding the impact forces generated when a heavy pipe section is stabbed into a coupling without physical deformation. This fact coupled with the fact that no flat surfaces exist on the thread crests reduces the possibility of cross threading or jamming that is so prevalent in oil well casing structure employing conventional thread forms.

Moreover, the thread form of the present invention permits a pipe joint in which the threads formed on the respective pipe lengths do not extend beyond the axial ends of the coupling that effects the joint. This feature greatly strengthens the joint due to the fact that, should the pipe threads provide imperfect runout grooves they would not extend beyond the coupling thereby to weaken the pipe body. Instead, all of the thread grooves formed on the surface of each pipe body are filled by mating crests in the coupling thread thus to reinforce the former.

It will be understood that various changes in the details, materials and arrangements of parts which have been herein described and illustrated in order to explain the nature of the invention, may be made by those skilled in the art within the principle and scope of the invention as expressed in the appended claims.

What is claimed:

1. A threaded joint including mating male and female members having complementary cooperating threaded surfaces formed on a taper of about one and one-half inch on diameter per foot of length, said threads having crests and roots which, in profile, are arcs of circles and an intermediate flank portion of finite length connecting said crests and roots, each flank portion being tangent along opposite sides to the adjacent crests and roots and being angularly disposed with respect to perpendiculars to the axis of the joint, the angles of said flanks being symmetrical with respect to said perpendiculars and being of a magnitude less than the angle of repose of the joint materials.

2. A threaded joint as recited in claim 1 in which all of the thread grooves on the male member of the joint receive the crests of threads on the mating female member.

3. A threaded joint as recited in claim 2 in which said flanks are inclined at an angle of less than 10° with respect to perpendiculars to the joint axis.

4. A threaded joint as recited in claim 3 in which said flanks are inclined at an angle of between 6½ and 8½ degrees with respect to said perpendiculars.

* * * * *